United States Patent [19]

Ohta et al.

[11] Patent Number: 4,705,713
[45] Date of Patent: Nov. 10, 1987

[54] FILM RESISTOR FOR FLOW MEASURING APPARATUS

[75] Inventors: Minoru Ohta, Okazaki; Kazuhiko Miura, Nukata; Michitoshi Onoda, Toyohashi; Yukio Iwasaki, Gifu; Tadashi Hattori, Okazaki, all of Japan

[73] Assignee: Nippon Soken, Inc., Nishio, Japan

[21] Appl. No.: 828,451

[22] Filed: Feb. 11, 1986

[30] Foreign Application Priority Data

Feb. 16, 1985 [JP] Japan .................................. 60-27545

[51] Int. Cl.⁴ ......................... B05D 1/00; H01L 29/04
[52] U.S. Cl. .................................... 428/209; 428/635;
428/901; 317/59; 317/67; 317/71
[58] Field of Search ........................... 357/59, 67, 71;
428/209, 635, 901

[56] References Cited

U.S. PATENT DOCUMENTS

| | | |
|---|---|---|
| 4,320,655 | 3/1982 | Kammermaier et al. |
| 4,345,465 | 8/1982 | Gruner et al. |
| 4,533,605 | 8/1985 | Hoffman ............................ 428/635 |
| 4,536,435 | 8/1985 | Utsumi et al. ...................... 428/209 |
| 4,567,542 | 1/1986 | Shimada et al. .................... 361/321 |

Primary Examiner—John E. Kittle
Assistant Examiner—Patrick J. Ryan
Attorney, Agent, or Firm—Cushman, Darby & Cushman

[57] ABSTRACT

A film resistor for a flow measuring apparatus including: a substrate; a first insulating layer on the substrate; a platinum (Pt) pattern on the first insulating layer; and a second insulating layer on the platinum pattern. A titanium dioxide ($TiO_2$) layer is provided between each of the first and second insulating layers and the platinum pattern.

7 Claims, 2 Drawing Figures

FILM RESISTOR FOR FLOW MEASURING APPARATUS

BACKGROUND OF THE INVENTION

1. Field of the Invention

The present invention relates to a film resistor used in a flow measuring apparatus such as an airflow sensor, liquid flow sensor, and the like.

2. Description of the Related Art

Generally, in an internal combustion engine, the amount of intake air is one of the most important parameters for controlling the fuel injection amount, ignition timing, and the like. A flow measuring apparatus, i.e., an airflow meter, is provided for measuring the same. One of the more common prior art airflow meters is the vane-type, which is, however, disadvantageous in scale, response speed characteristics, and the like. Recently, airflow meters having temperature-dependent resistors have been developed, which are advantageous in scale, response speed characteristics, and the like.

There are two types of airflow meters having temperature-dependent resistors, i.e., the heater-type and direct-heated type. In all types, a heating means is provided.

Various materials such as single metal, alloy, and the like may be utilized for such a heating means. However, in the case of an intake air amount sensor in an internal combustion engine, the characteristics of resistance of the heating means must be linear in accordance with the temperature, to compensate for a wide temperature range. Also, the heating means is required to be physically stable, since it is exposed to high temperatures reaching hundreds of degrees imposed by backfiring, and is exposed to an atmosphere containing gasoline vapor or other fuel or lubricant vapor having a high humidity. Platinum has been used as a metal which satisfies the above-requirements. In a prior art film resistor as the heating means using platinum, platinum is formed by evaporation or sputtering on a substrate such as ceramic, silicon or the like, however, since platinum is a stable metal, the bonding strength of platinum and the underlying or overlying insulating material is poor, and accordingly, they are easily separated from each other.

SUMMARY OF THE INVENTION

It is an object of the present invention to provide a firm film resistor used in a flow measuring apparatus.

According to the present invention, a titanium dioxide ($TiO_2$) layer is provided between the platinum and the underlying and overlying insulating material.

The material $TiO_2$ has the advantages of waterproofness, processibility, and has strong bonding characteristics with platinum. Also, the coefficient of thermal expansion thereof is about the same as that of platinum. Thus, the strength of the film resistor is improved.

The material $TiO_2$ will now be explained in more detail.

As insulating layers having good waterproofness and processibility (etching), $SiO_2$, $Si_3N_4$, $TiO_2$, $Al_2O_3$, and the like are utilized. The bonding strengths for Pt and gold (Au) are as follows:
$SiO_2$, $Si_3N_4$: $0.1 \times 10^7$ N/m$^2$;
$TiO_2$: $0.9 \times 10^7$ N/m$^2$; and
$Al_2O_3$: $1.1 \times 10^7$ N/m$^2$.
Thus, the bonding strength of $TiO_2$ and $Al_2O_3$ for Pt and Au is ten times that of $SiO_2$ and $Si_3N_4$ for Pt and Au.

Note that Au is used as a material for reducing the resistance of connections of film resistors.

Further, the coefficients of heat expansion are as follows:
Au: $14.2 \times 10^{-6}$/deg;
Pt: $8.9 \times 10^{-6}$/deg;
$TiO_2$: $8.2 \times 10^{-6}$/deg; and
$Al_2O_3$: $6.2 \times 10^{-6}$/deg.
Therefore, in view of an intake air amount sensor of an internal combustion engine wherein the temperature range of the intake air is wide, for example, from $-40°$ C. to $120°$ C., the used material $TiO_2$ is excellent in that it has the closest heat expansion coefficient to that of Pt and Au.

Thus, it is apparent that the material $TiO_2$ is excellent as a material to be inserted between the material Pt of the film resistor and the underlying and overlying insulating layers.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
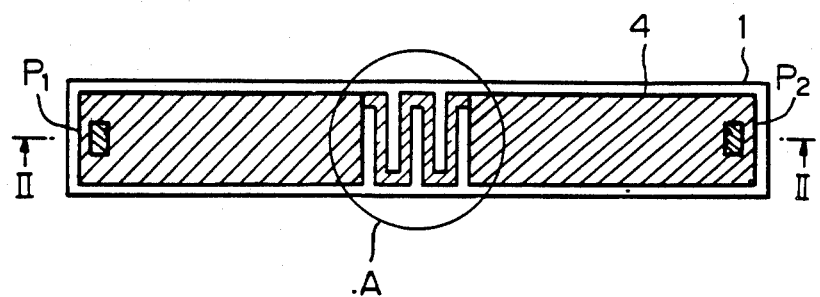
FIG. 1 is a plan view illustrating an embodiment of the film resistor according to the present invention.
Figure 2:
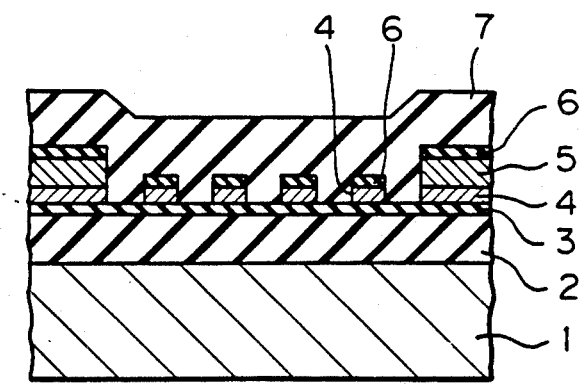
FIG. 2 is a fragmentary, enlarged-scale cross-sectional view taken along the line II—II of FIG. 1.

As shown in FIG. 1, a Pt pattern layer 4 is formed on a monocrystalline silicon substrate 1 by evaporation (or sputtering) and etching. The part of the layer 4 indicated by a dashed-line circle A serves as a heating means. Note that $P_1$ and $P_2$ are electrode pads. Referring to FIG. 2, the monocrystal silicon substrate 1 is thermally oxidized to obtain a first insulating layer (underlying insulating material), i.e., an $SiO_2$ layer 2, and a $TiO_2$ pattern layer 3 according to the present invention is formed thereon. Also, formed on the $TiO_2$ pattern layer 3 is the above-mentioned Pt pattern layer 4. Further, in order to reduce the resistance of the connections, the Pt pattern layer 4 is doubled by an Au pattern layer 5. Then, formed on the Pt pattern layer 4 including the double-layer portion by the Au pattern layer 5 is a second $TiO_2$ pattern layer 6. Further, formed on the second $TiO_2$ pattern layer 6 is a second insulating layer (passivation layer), i.e., a $SiO_2$ layer 7 by chemical vaporization deposition (CVD), thereby covering the layers 4, 5, and 6. Note that the second insulating layer can be made of silicon nitride ($Si_3N_4$).

Thus, the $TiO_2$ pattern layer 3 having a large bonding strength to the Pt pattern layer 4 is provided between the $SiO_2$ layer 2 as the first insulating layer and the Pt pattern layer 4, and a $TiO_2$ pattern layer 6 having a large bonding strength to the Pt pattern layer 4 is also provided between the Pt pattern layer 4 and the second insulating layer, i.e, the $SiO_2$ layer 7.

Note tha the Au pattern layer 5 for connections has a small bonding strength to $SiO_2$ or $Si_3N_4$, and thus the provision of a $TiO_2$ pattern layer 6 having a large bonding strength to the Au pattern layer 5 is advantageous.

Note that ceramic can be used as the material of the substrate 1.

As explained hereinbefore, according to the present invention, the bonding strength of the Pt pattern layer is increased, thereby obtaining a firm film resistor for a flow measuring apparatus.

What is claimed is:

1. A film resistor for a flow measuring apparatus, comprising:
   a substrate;
   a first insulating layer formed on said substrate;
   a first titanium dioxide ($TiO_2$) layer formed on said first insulating layer;
   a platinum (Pt) pattern formed on said first titanium dioxide layer;
   a second titanium dioxide ($TiO_2$) layer formed on said platinum pattern; and
   a second insulating layer formed on said second titanium dioxide layer,
   said first and second titanium dioxide layers respectively improving bonding strength of said platinum pattern to said first insulating layer and to said second insulating layer in comparison with an otherwise identical film resistor from which said first and second titanium dioxide layers are omitted.

2. A film resistor as set forth in claim 1, further comprising:
   said platinum pattern being provided with two electrode connection portions which are spaced from one another along said platinum pattern;
   a layer of gold (Au) provided directly on said platinum pattern in said two electrode portions, so as to intervene thereon between said platinum pattern and said second titanium dioxide layer,
   said second titanium dioxide layer improving bonding strength of said gold layer to said second insulating layer in comparison with an otherwise identical film resistor from which said second titanium dioxide layer is omitted from being provided on said gold layer.

3. A film resistor as set forth in claim 1, wherein said substrate is made of monocrystalline silicon.

4. A film resistor as set forth in claim 3, wherein said first insulating layer is obtained by thermally oxidizing said monocrystalline silicon.

5. A film resistor as set forth in claim 1, wherein said substrate is made of ceramic.

6. A film resistor as set forth in claim 1, wherein said first insulating layer is made of at least one of silicon dioxide ($SiO_2$) and silicon nitride ($Si_3N_4$) by CVD.

7. A film resistor as set forth in claim 1, wherein said second insulating layer is made of at least one of silicon dioxide ($SiO_2$) and silicon nitride ($Si_3N_4$) by CVD.

* * * * *